United States Patent
Fink

(10) Patent No.: US 9,306,403 B2
(45) Date of Patent: Apr. 5, 2016

(54) BATTERY MODULE, BATTERY MANAGEMENT SYSTEM, SYSTEM FOR SUPPLYING A DRIVE OF A MACHINE SUITABLE FOR GENERATING TORQUE WITH ELECTRICAL ENERGY, AND A MOTOR VEHICLE

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 13/959,265

(22) Filed: Aug. 5, 2013

(65) Prior Publication Data
US 2014/0042936 A1    Feb. 13, 2014

(30) Foreign Application Priority Data

Aug. 7, 2012   (DE) .......................... 10 2012 213 926

(51) Int. Cl.
  *H02J 7/00*   (2006.01)
  *H02P 31/00*  (2006.01)
  *B60L 11/18*  (2006.01)

(52) U.S. Cl.
CPC ........... *H02J 7/0013* (2013.01); *B60L 11/1866* (2013.01); *H02J 7/0016* (2013.01); *H02P 31/00* (2013.01); *B60L 2240/547* (2013.01); *B60L 2240/549* (2013.01); *Y02T 10/7055* (2013.01)

(58) Field of Classification Search
CPC .... H02J 7/0016; H02J 7/0026; B50L 11/1866
USPC .......................................................... 320/116
See application file for complete search history.

(56) References Cited

U.S. PATENT DOCUMENTS

| | | | |
|---|---|---|---|
| 5,907,238 A * | 5/1999 | Owerko et al. ............... | 323/349 |
| 7,733,059 B2 * | 6/2010 | Yoshida ........................ | 320/118 |
| 8,179,139 B2 * | 5/2012 | Kawasumi et al. ........... | 324/430 |
| 8,493,031 B2 * | 7/2013 | Murao et al. .................. | 320/132 |
| 8,723,480 B2 * | 5/2014 | Lim et al. ...................... | 320/118 |
| 8,841,888 B2 * | 9/2014 | Li .................................. | 320/162 |
| 8,957,636 B2 * | 2/2015 | Ochiai .......................... | 320/118 |
| 8,970,144 B2 * | 3/2015 | Fink .............................. | 318/139 |
| 2011/0127962 A1 * | 6/2011 | Murao et al. .................. | 320/118 |
| 2011/0140665 A1 * | 6/2011 | Tamezane et al. ............ | 320/118 |
| 2013/0035819 A1 * | 2/2013 | Wolft .............................. | 701/22 |
| 2013/0187616 A1 * | 7/2013 | Chuang et al. ................ | 320/136 |

FOREIGN PATENT DOCUMENTS

| | | | | |
|---|---|---|---|---|
| GB |   | 2500427 A | 9/2013 | |
| WO | WO2011128046 A1 * | | 10/2011 | ............... H02J 7/00 |

* cited by examiner

*Primary Examiner* — Sun Lin
(74) *Attorney, Agent, or Firm* — Maginot, Moore & Beck LLP

(57) ABSTRACT

A battery module includes lithium-ion battery cells and at least one discharge circuit configured to discharge the battery cells. The discharge circuit includes a control signal input, a switch, and a resistor and is configured to close the switch in reaction to a control signal at the control signal input, in order to electrically connect terminals of the battery module. The battery module can then be reliably discharged by a corresponding control signal.

8 Claims, 4 Drawing Sheets

BATTERY MODULE, BATTERY MANAGEMENT SYSTEM, SYSTEM FOR SUPPLYING A DRIVE OF A MACHINE SUITABLE FOR GENERATING TORQUE WITH ELECTRICAL ENERGY, AND A MOTOR VEHICLE

This application claims priority under 35 U.S.C. §119 to patent application no. DE 10 2012 213 926.5, filed on Aug. 7, 2012 in Germany, the disclosure of which is incorporated herein by reference in its entirety.

BACKGROUND

The present disclosure relates to a battery module comprising battery cells, for example lithium-ion battery cells. Furthermore, the present disclosure relates to a battery management system and a system for supplying a drive of a machine suitable for generating torque with electrical energy. Furthermore, the present disclosure relates to a motor vehicle.

High-power battery systems for generating AC voltage often comprise a battery based on lithium-ion technology and an inverter having power switches arranged in series on parallel current branches. If the inverter of such a battery system comprises three or more parallel current paths, then the battery system can be embodied directly for supplying a machine suitable for generating torque for the driving of hybrid and electric vehicles. Such battery systems are also designated as traction battery systems or as traction batteries for short.

In order to obtain the power and energy data required in hybrid and electric vehicles and in other AC voltage-based applications, batteries have electrical voltages of up to 450 volts. In traction batteries, for this purpose, individual battery cells are connected in series and in part additionally in parallel.

In high-power batteries, therefore, an electrical voltage limit of 60 volts which is classified as non-critical with regard to contact by humans, is usually exceeded.

The basic circuit diagram of a battery module 220 according to the prior art is illustrated in FIG. 1. Alongside the battery cells 140 of the battery module 220, the battery system also has a so-called charging and disconnecting device 130, which in FIG. 1 is arranged between the positive pole of the battery system and the battery cells 140 of the battery module 220. By means of a disconnecting switch 120 and a disconnecting switch 125, a positive pole of the battery cells can be electrically disconnected from the positive pole of the battery system. By means of the disconnecting switch 120, the positive pole of the battery cells can also be electrically connected to the positive pole of the battery with low impedance, in other words with low resistance. With the disconnecting switch 120 open, the positive pole of the battery cells can also be electrically connected to the positive pole of the battery via a charging current source 110 by means of the disconnecting switch 125. As an optional functional unit, a further disconnecting device 170 is illustrated in FIG. 1, by means of which the battery cells 140, if required, can be disconnected from the negative pole of the battery system in a two-pole manner via a second disconnecting switch 150. The battery system in FIG. 1 additionally has a service disconnect plug 160. This is a mechanical disconnecting plug which, in the event of accidents or other hazards, can be withdrawn by rescue services or maintenance personnel, in order to disconnect the battery in a one-pole manner. The arrangement of the service disconnect plug 160 in FIG. 1 is by way of example: a non-symmetrical arrangement is likewise possible.

FIG. 2 illustrates the basic circuit diagram of an electrical drive system according to the prior art, as is used for example in electric and hybrid vehicles. The electric machine 200, which is embodied as a polyphase machine, for example, is supplied via an inverter or pulse-controlled inverter 210.

In the case of the battery systems currently known it is customary that in the event of a critical state being identified, such as an accident, for example, in which the restraint systems are triggered, the battery are disconnected from the on-board traction power supply system of the vehicle. If possible by virtue of two disconnecting devices being present, two-pole disconnection from the inverter can be effected in this case.

SUMMARY

The disclosure presents a battery module for discharging a battery which a battery system comprises. The battery module is characterized by at least one discharge circuit for discharging battery cells which the battery module comprises, wherein the discharge circuit comprises a control signal input, a switch and a resistor and is designed to close the switch in reaction to a control signal at the control signal input, in order to electrically connect terminals of the battery module.

The battery module can then be reliably discharged by means of a corresponding control signal. Internal short circuits that can still occur for example even a relatively long time after a mechanical force action can then no longer lead to the cells catching fire.

In one embodiment, the resistor is designed such that the battery cells can be discharged proceeding from a full charge state within a predefined time.

By means of time monitoring it is then possible to ascertain when the module is fully discharged.

In this case, the switch can be an electromechanical switch or a semiconductor switch.

This allows simple switching.

It is furthermore advantageous that the battery cells of the battery module are grouped in battery cell strings, wherein each battery cell string comprises a discharge circuit.

The discharging duration can thus be shortened.

An electrical connection situated between two of the battery cell strings can comprise a withdrawable service disconnect plug, wherein the at least one electrical connection is interrupted when the service disconnect plug is withdrawn.

This increases the safety from discharge.

If the battery module comprises an electronic unit for matching charge states of the battery cells by discharging the battery cells via a parallel circuit formed by ohmic resistors, the electronic unit can be used also to discharge the battery cells via the parallel circuit in reaction to the control signal.

The discharging duration can thus be shortened further.

The disclosure furthermore proposes a battery management system for a battery system, wherein the battery system comprises at least one battery module according to the disclosure. The battery management system is characterized in that the battery management system comprises a control signal output and is designed to provide a control signal at the signal output, wherein the control signal provided is suitable for causing the switch of the discharge circuit to be closed.

In one embodiment of the battery management system for the embodiment of the battery module which comprises an electronic unit for matching charge states of the battery cells by discharging the battery cells via a parallel circuit formed by ohmic resistors, the control signal provided is furthermore suitable for causing a discharge via the parallel circuit.

The disclosure finally proposes a motor vehicle comprising a machine suitable for generating torque from electrical energy and a system for supplying the machine with electrical energy. The motor vehicle is characterized in that the system comprises a battery module according to the disclosure and a battery management system according to the disclosure.

BRIEF DESCRIPTION OF THE DRAWINGS

Exemplary embodiments of the disclosure are explained in greater detail with reference to the drawings and the following description.

DETAILED DESCRIPTION

Figure 1:
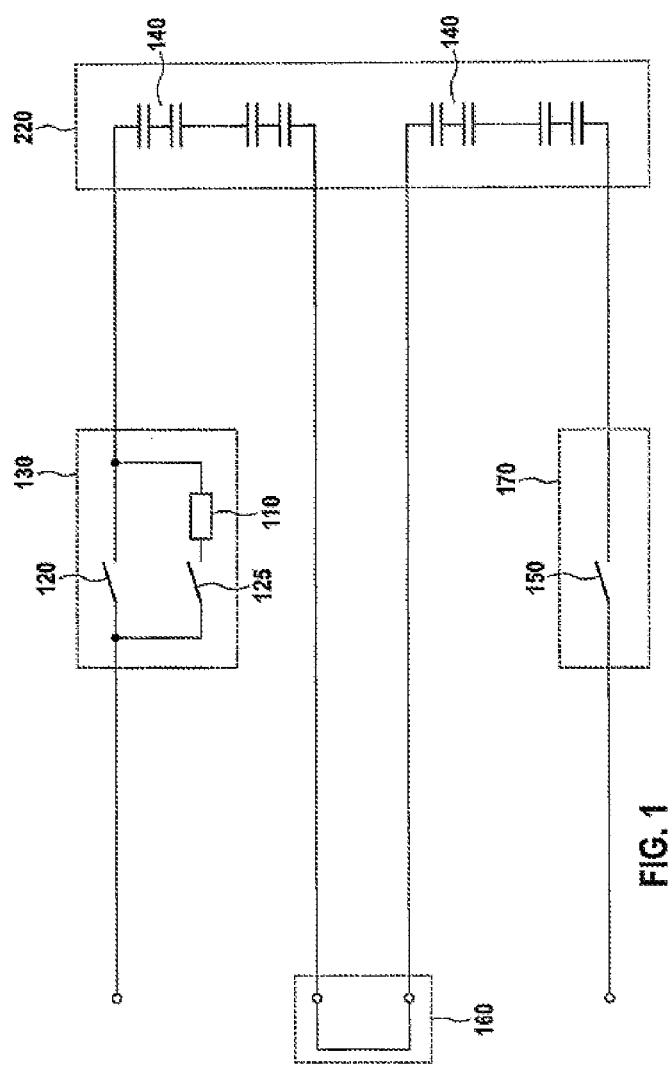
FIG. 1 shows a basic circuit diagram of a battery system according to the prior art.
Figure 2:
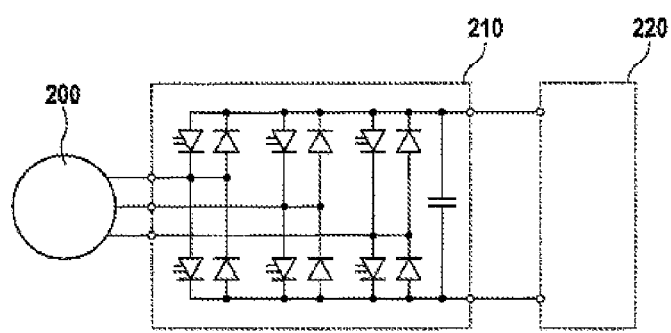
FIG. 2 shows a basic circuit diagram of a drive system according to the prior art.
Figure 3:
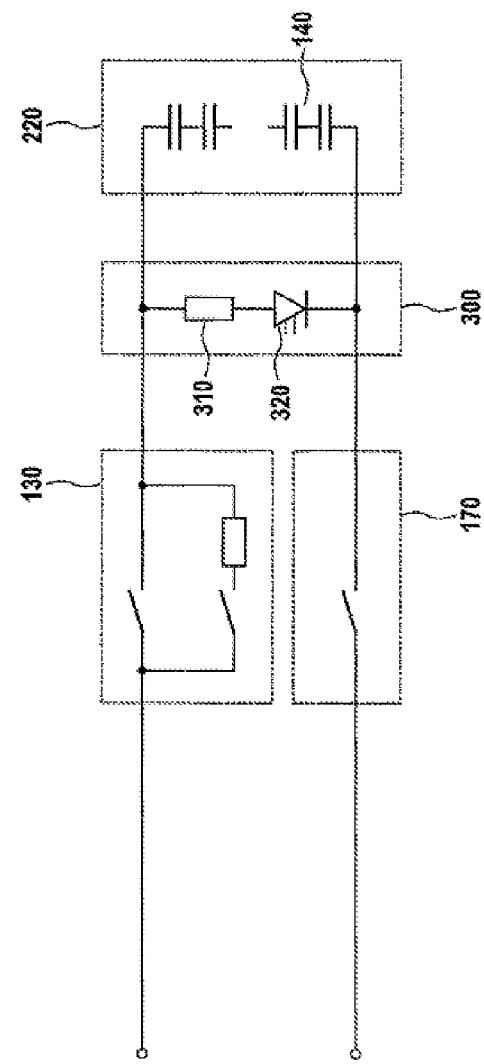
FIG. 3 shows a basic circuit diagram of a first exemplary embodiment of the battery module according to the disclosure.

Development-accompanying tests on battery systems for generating AC voltage such as, for example, lithium-ion batteries having an inverter with power switches arranged in series on parallel current branches reveal that in battery systems which initially caused no problems after mechanical tests despite severe mechanical force actions on the batteries during the test, cases repeatedly occurred in which the initially inconspicuous battery systems caught fire weeks after the mechanical tests.

The exemplary embodiments of the present disclosure as described in greater detail below allow battery cells to be transferred to a safe state by controlled discharge after an accident or in the event of serious technical problems, such as, for example, imminent overcharging of the battery cells by a charger not functioning properly. Even in the case of the battery remaining in this safe state for a relatively long time, this cannot lead to a fire. The battery cells are discharged here to an extent such that, for example, internal short circuits can no longer lead to the cells catching fire.

One exemplary embodiment of the disclosure provides for carrying out, immediately after identifying an accident or a serious technical problem, by means of a battery management system, firstly at least one-pole or better, if possible, two-pole disconnection of the battery 220 by means of the opening of the disconnecting switches.

Subsequently, the battery management system sends a command for closing the switch 320 via the communication interface of the cycling-down circuit 300. With the switch 320 closed, the battery cells 140 are then discharged via the resistor 310 of the cycling-down circuit 300.

Figure 4:
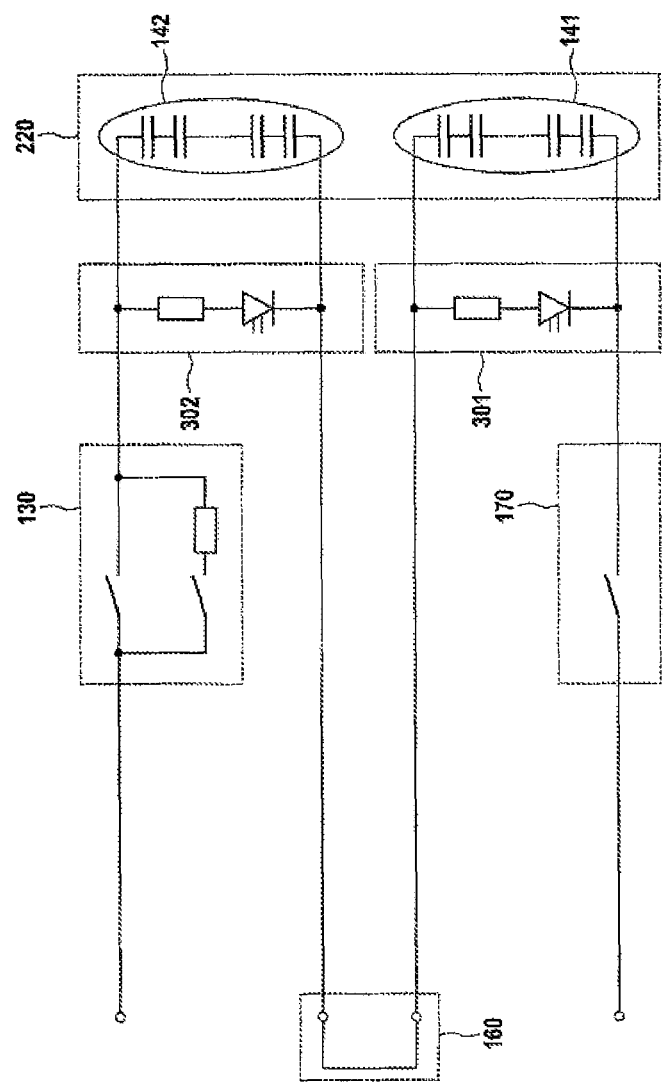
FIG. 4 shows a basic circuit diagram of a second exemplary embodiment of the battery module according to the disclosure.

If a plurality of discharge circuits 301 and 302 are present, which are respectively provided for discharging battery cell strings 141 and 142 contained in the battery module, the battery management system sends the control command for closing the switches in all the battery cell strings 141 and 142. This is illustrated by way of example for two strings in FIG. 4.

In an exemplary embodiment that is not illustrated in the drawings, the battery module additionally has an electronic unit for charge equalization. This is also designated as cell balancing. With the aid of the electronic unit it is possible to discharge the cells in a targeted manner via a parallel circuit formed by ohmic resistors and thus to match the charge states of the cells to one another. The exemplary embodiment which is not illustrated in the figures in this case comprises a driving possibility for driving the electronic unit, such that the cells are discharged simultaneously via both the cycling-down or discharge circuit and the cell balancing electronic unit. This form of additional discharge is independent of whether disconnecting devices have been disconnected the battery from a load, for example an electric motor supplied via an inverter, or whether a service disconnect plug between two battery cell strings contained in the module has been withdrawn.

In another exemplary embodiment which is not illustrated in the drawings, the battery module together with an inverter or pulse-controlled inverter serves for supplying an electric machine, embodied for example as a polyphase machine. The inverter comprises at least parallel current branches having power switches which are connected in series and which can be switched by external driving of the inverter. The inverter is designed for external driving which has the effect that power switches in at least one of the parallel current branches are switched on simultaneously. The other exemplary embodiment which is not illustrated in the figures in this case comprises a driving possibility for driving an electronic unit of the inverter and the disconnecting devices, such that the cells are discharged simultaneously both via the cycling-down or discharge circuit and via the charging current source and the inverter.

This other embodiment which is not shown is especially suitable for a system without a service disconnect plug, or for situations in which the service disconnect plug is not withdrawn. However, additional discharging via the charging current source and the inverter can always be initiated by corresponding driving by the battery management system, independently of whether or not such additional discharging is made impossible by withdrawal of the service disconnect plug or a defect on the inverter.

In the case of additional discharging via the charging current source 110, the latter has to be designed for the current intensities that occur during the additional discharging. Alternatively, the battery management system can check, during discharging, whether an overloading of the current source 110 is imminent. If so, the charging current source 110 is temporarily switched off. In this case, an overloading can be identified by the battery management system in a model-based manner for example. After the checking has revealed that the charging current source 110 has recovered from the overloading on account of the switch-off and is again ready to discharge the battery cells 140, it is switched on again by the battery management system and the battery 220 is discharged further.

Whether via the cycling-down circuit alone or with the aid of cell balancing electronic unit and/or inverter, the cells 140 of the battery system are in this way discharged to an extent such that an uncontrolled internal or external short circuit occurring later can no longer lead to a hazard.

After ascertaining that the battery 220 is sufficiently discharged, in the other exemplary embodiment which is not shown, the battery 220 can again be disconnected from the inverter 210 in a two-pole manner by the opening 11 of the disconnecting switches 120 and 150 and the simultaneous switch-off 2 of the charging current source 110.

In principle, it is expedient to transfer the battery cells 140 to a discharged state in the event of technical problems. As an example, mention shall be made of a charging process for a battery 220 in an electric vehicle in which the charger, on account of a fault, does not reduce the charging current even though the battery 220 is fully charged.

In this case, the battery 220 would be discharged in one of the ways described.

What is claimed is:

1. A battery module comprising:
   a plurality of battery cells;
   a plurality of terminals; and
   at least one discharge circuit including a control signal input, a switch, and a resistor, the at least one discharge circuit being configured (i) to discharge the plurality of battery cells, and (ii) to close the switch in reaction to a control signal at the control signal input, in order to electrically connect terminals of the plurality of terminals,
   wherein the resistor is configured such that the battery cells of the plurality of battery cells are dischargeable proceeding from a full charge state within a predefined time.

2. The battery module according to claim 1, wherein the switch is an electromechanical switch or a semiconductor switch.

3. A battery module comprising:
   a plurality of battery cells;
   a plurality of terminals; and
   at least one discharge circuit including a control signal input, a switch, and a resistor, the at least one discharge circuit being configured (i) to discharge the plurality of battery cells, and (ii) to close the switch in reaction to a control signal at the control signal input, in order to electrically connect terminals of the plurality of terminals
   wherein:
   the battery cells of the plurality of battery cells are grouped in battery cell strings, and
   each battery cell string includes a discharge circuit.

4. The battery module according to claim 3, further comprising:
   at least one electrical connection structure situated between two of the battery cell strings, the at least one electrical connection structure including a withdrawable service disconnect plug,
   wherein the at least one electrical connection structure is configured to electrically connect the two battery cell strings, and
   wherein an electrical connection between the two battery cell strings is interrupted when the withdrawable service disconnect plug is withdrawn.

5. A battery module comprising:
   a plurality of battery cells;
   a plurality of terminals;
   at least one discharge circuit including a control signal input, a switch, and a resistor, the at least one discharge circuit being configured (i) to discharge the plurality of battery cells, and (ii) to close the switch in reaction to a control signal at the control signal input, in order to electrically connect terminals of the plurality of terminals, and
   an electronic unit configured (i) to match charge states of the battery cells of the plurality of battery cells by discharging the battery cells via a parallel circuit formed by ohmic resistors, and (ii) to discharge the battery cells of the plurality of battery cells via the parallel circuit in reaction to the control signal.

6. A battery management system for a battery system, comprising:
   a control signal output structure,
   wherein the battery management system is configured to provide a control signal at the control signal output structure,
   wherein the battery system includes at least one battery module including (i) a plurality of battery cells, (ii) a plurality of terminals, and (iii) at least one discharge circuit including a control signal input, a switch, and a resistor, the at least one discharge circuit being configured to discharge the plurality of battery cells, and to close the switch in reaction to a control signal at the control signal input, in order to electrically connect terminals of the plurality of terminals, and
   wherein the control signal provided is suitable for causing the switch of the discharge circuit to be closed,
   wherein the at least one battery module includes an electronic unit configured to match charge states of the battery cells of the plurality of battery cells by discharging the battery cells via a parallel circuit formed by ohmic resistors, and
   wherein the control signal is furthermore suitable for causing a discharge via the parallel circuit.

7. A system for supplying a drive of a machine suitable for generating a torque with electrical energy, comprising:
   a battery module including (i) a plurality of battery cells, (ii) a plurality of terminals, and (iii) at least one discharge circuit including a control signal input, a switch, and a resistor configured such that the battery cells of the plurality of battery cells are dischargeable proceeding from a full charge state within a predefined time, the at least one discharge circuit being configured to discharge the plurality of battery cells, and to close the switch in reaction to a control signal at the control signal input, in order to electrically connect terminals of the plurality of terminals; and
   a battery management system including a control signal output structure,
   wherein the battery management system is configured to provide a control signal at the control signal output structure, and
   wherein the control signal provided is suitable for causing the switch of the discharge circuit to be closed.

8. The system according to claim 7, wherein:
   the system is included in a motor vehicle having (i) a machine suitable for generating a torque, and (ii) an inverter, and
   the system is configured to supply the machine with an electric energy suitable for generating the torque only in a configuration in which the switch of the discharge circuit is opened.

* * * * *